(12) United States Patent
Rosin et al.

(10) Patent No.: US 7,461,508 B2
(45) Date of Patent: Dec. 9, 2008

(54) METHOD AND DEVICE FOR REGULATING THE CHARGE PRESSURE OF AN INTERNAL COMBUSTION ENGINE

(75) Inventors: Ulrich Rosin, Stuttgart (DE); Thomas Bleile, Stuttgart (DE); Michael Scheidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 11/281,690

(22) Filed: Nov. 16, 2005

(65) Prior Publication Data

US 2006/0123782 A1 Jun. 15, 2006

(30) Foreign Application Priority Data

Nov. 25, 2004 (DE) .................. 10 2004 056 894

(51) Int. Cl.
- *F02B 33/44* (2006.01)
- *F02B 37/12* (2006.01)
- *F02B 37/007* (2006.01)
- *F02B 37/18* (2006.01)
- *F02B 37/24* (2006.01)
- *F02D 23/00* (2006.01)

(52) U.S. Cl. ........................ 60/612; 60/602; 123/562

(58) Field of Classification Search .............. 60/612, 60/602, 605.2; 123/562, 568.14; F02B 37/007, F02B 37/12, 37/18, 37/24
See application file for complete search history.

(56) References Cited

U.S. PATENT DOCUMENTS

| | | | | |
|---|---|---|---|---|
| 5,142,866 A | * | 9/1992 | Yanagihara et al. .......... | 60/612 |
| 6,112,523 A | * | 9/2000 | Kamo et al. ................... | 60/612 |
| 6,662,562 B2 | * | 12/2003 | Engel et al. .................. | 60/602 |
| 6,968,689 B2 | * | 11/2005 | Bleile et al. .................. | 60/612 |
| 6,973,787 B2 | * | 12/2005 | Klingel ......................... | 60/612 |
| 7,174,777 B2 | * | 2/2007 | Fischer et al. ............... | 73/118.1 |
| 2005/0121008 A1 | * | 6/2005 | Kilkenny et al. ........ | 123/568.14 |
| 2006/0042246 A1 | * | 3/2006 | Gray et al. .................... | 60/612 |
| 2006/0059910 A1 | * | 3/2006 | Spaeder et al. ............... | 60/612 |
| 2006/0070381 A1 | * | 4/2006 | Parlow et al. ................ | 60/612 |
| 2007/0062188 A1 | * | 3/2007 | Fry et al. ...................... | 60/612 |
| 2007/0068158 A1 | * | 3/2007 | Sun et al. .................... | 60/605.2 |

FOREIGN PATENT DOCUMENTS

| | | |
|---|---|---|
| DE | 100 10 978 | 9/1991 |
| DE | 41 07 693 | 9/1992 |
| EP | 0 454 943 | 3/1994 |
| WO | WO 0166921 A1 * | 9/2001 |
| WO | WO 2004046519 A1 * | 6/2004 |
| WO | WO 2006050746 A1 * | 5/2006 |

* cited by examiner

*Primary Examiner*—Thai-Ba Trieu
(74) *Attorney, Agent, or Firm*—Kenyon & Kenyon LLP

(57) ABSTRACT

A method and a device are provided for regulating the charge pressure of an internal combustion engine having at least two exhaust gas turbochargers that set a target charge pressure rapidly and without overshooting. A first actuating element is provided with which the charge pressure of a first exhaust gas turbocharger is set, and a second actuating element is provided with which the charge pressure of a second exhaust gas turbocharger is set. Dependent on the exhaust gas back pressure prevailing in the exhaust gas channel at the output of the internal combustion engine, a first controlled variable is determined for the first actuating element, and a second controlled variable is determined for the second actuating element.

15 Claims, 4 Drawing Sheets

METHOD AND DEVICE FOR REGULATING THE CHARGE PRESSURE OF AN INTERNAL COMBUSTION ENGINE

FIELD OF THE INVENTION

The present invention relates to a method and a device for regulating the charge pressure (or boost pressure) of an internal combustion engine having at least two exhaust gas turbochargers.

BACKGROUND INFORMATION

In a multiple-stage supercharging system, a first actuating element is provided with which the charge pressure of a first exhaust gas turbocharger is set, and a second actuating element is provided with which the charge pressure of a second exhaust gas turbocharger is set.

As described, for example, in published German patent document DE 41 07 693 and published European patent document EP 04 54 943, the charge pressure regulation involves a regulator forming a controlled variable dependent on the deviation between a target charge pressure and an actual charge pressure. This controlled variable is used either to control a valve in a bypass that bridges the turbine of the charger in the exhaust gas channel, (e.g., as in published German patent document DE 41 07 693), or to control the adjustable guide vanes of a turbine having variable geometry (e.g., as in published European patent document EP 04 54 943).

Increasingly higher demands are being made on engines with respect to exhaust gas and consumption values. An exhaust gas turbocharger with variable turbine geometry enables an adaptation to the current engine operating point by adjusting the turbine guide vanes. With this technique, a delayed response of the turbocharger (turbo lag) can be reduced, while simultaneously improving the efficiency of the engine. During acceleration phases, strong overshooting of the charge pressure often occurs, which places very high mechanical stress on the turbocharger. In addition, an excessive closing of the variable turbine geometry in the acceleration phase can result in an undesirably high exhaust gas back pressure, which has a negative influence on the dynamics and efficiency of the engine.

Published German patent document DE 10 010 978 describes a device for controlling the charge pressure of an internal combustion engine having an exhaust gas turbocharger whose turbine situated in the exhaust gas channel of the internal combustion engine has a changeable geometry, the regulation of the charge pressure taking place via an adjustment of the turbine geometry. A regulator forms a controlled variable for the turbine geometry dependent on the exhaust gas back pressure prevailing in the exhaust gas channel before the turbine. In this way, the above-described problems are satisfactorily solved for the case of an internal combustion engine having single-stage supercharging.

An object of the present invention is to provide a method and a device for charge pressure regulation of an internal combustion engine having multiple-stage supercharging, the charge pressure follows the curve of the desired charge pressure target value as rapidly as possible when there is a change in load, and an overshooting of the charge pressure target value is avoided in order to protect the turbocharger from unnecessarily high stress.

SUMMARY

In accordance with the present invention, dependent on the exhaust gas back pressure prevailing in the exhaust gas channel at the output of the internal combustion engine, a first controlled variable is determined for the first actuating element, and a second controlled variable is determined for the second actuating element. The exhaust gas back pressure reacts significantly faster than does the charge pressure to a changed characteristic of the control path—e.g., change in engine speed, change in load, change of an exhaust gas recirculation—or to disturbances, for example in the actuating system. If, according to the present invention, the exhaust gas back pressure is used for the derivation of the controlled variables also for an internal combustion engine having multiple-stage supercharging, this results in a very fast reaction of the charge pressure regulation to a change in the predetermined target charge pressure for multiple-stage supercharging as well. Here, the predetermined target charge pressure can be set without overshooting. In this way, the turbocharger is also protected from excess engine speeds.

According to an example embodiment of the present invention, a first regulator advantageously determines a target exhaust gas back pressure from the deviation between a target charge pressure and an actual charge pressure, and a second regulator derives the controlled variables for the actuating elements from the deviation between the target exhaust gas back pressure and a measured or estimated actual exhaust gas back pressure. In this way, a charge pressure regulation is achieved with a lower-level (or secondary) regulation of the exhaust gas back pressure and a division of the regulator output among a plurality of actuating elements. This permits the fast reaction of the charge pressure regulation to a change in the predetermined target charge pressure for multiple-stage supercharging, in comparison with single-stage supercharging, and this improvement is realized with only a minimal additional expense.

In addition, it is advantageous if the target exhaust gas back pressure is limited to a predetermined range. In this way, the components of the internal combustion engine can effectively be protected for the case of multiple-stage supercharging and the higher exhaust gas back pressures that occur there in comparison with single-stage supercharging.

DETAILED DESCRIPTION

Figure 1:
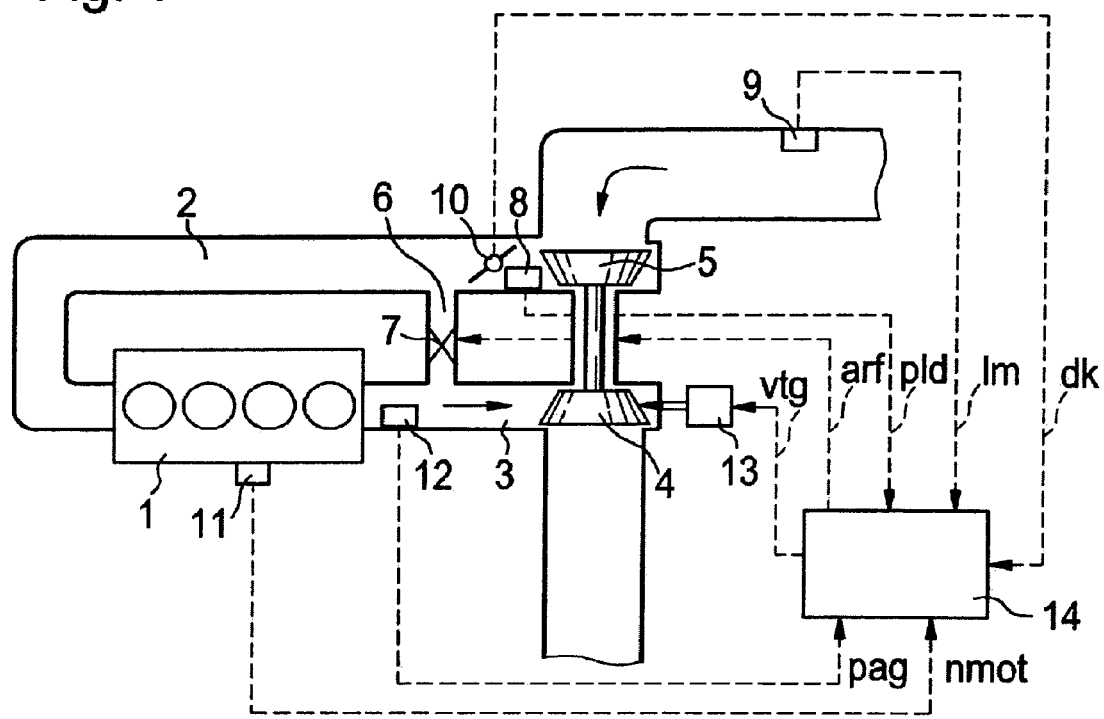
FIG. 1 shows a schematic representation of an internal combustion engine having a conventional exhaust gas turbocharger.

In the context of single-stage supercharging, FIG. 1 shows an internal combustion engine 1 having an intake port 2 and an exhaust gas channel 3. Turbine 4 is situated in exhaust gas channel 3, and the compressor 5 of an exhaust gas turbocharger is situated in intake port 2. In addition, the internal combustion engine can be equipped with an exhaust gas recirculation channel 6 that connects exhaust gas channel 3 with induction pipe 2. A controllable valve 7 is situated in exhaust gas recirculation channel 6. In induction pipe 2 there are situated a pressure sensor 8 for measuring the charge pressure pld and an air mass sensor 9 for measuring the suctioned air mass lm. Moreover, a throttle valve 10 is situated in the induction pipe. A sensor 11 acquires the engine speed nmot of the internal combustion engine, and a pressure sensor 12 in exhaust gas channel 3 measures the exhaust gas back pressure pag before turbine 4. An actuator 13 is present that acts on the turbine geometry, i.e., carries out an adjustment of the turbine guide vanes. This actuator 13 receives a controlled variable vtg from a control device 14. In order to derive controlled variable vtg for the turbine geometry and to derive a controlled variable arf for the exhaust gas recirculation valve, control device 14 uses as input quantities the engine speed nmot, the throttle valve position dk, the suctioned air mass lm, the charge pressure pld, and the exhaust gas back pressure pag.

Figure 2:
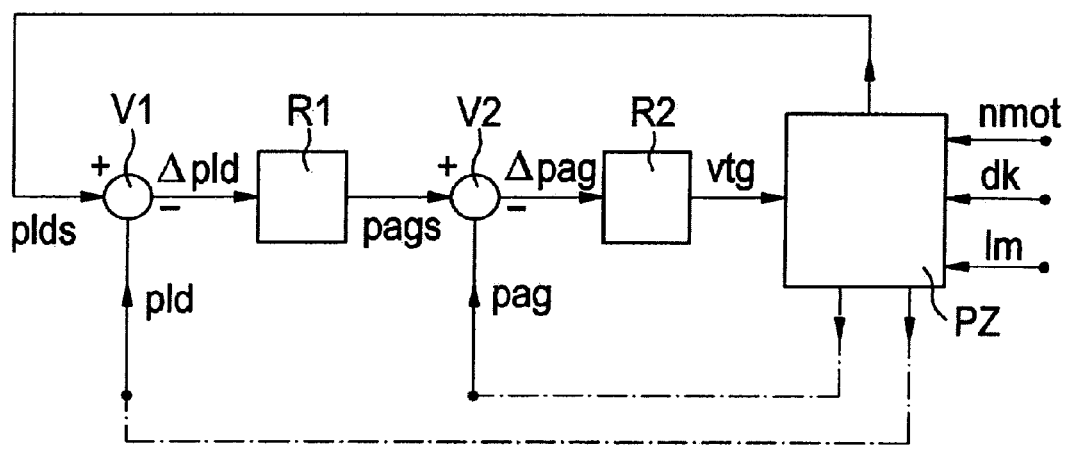
FIG. 2 shows a schematic block diagram illustrating the regulation of the charge pressure in single-stage supercharging.

The manner in which control device 14 derives controlled variable vtg for the turbine geometry from the above-named input quantities is described in more detail on the basis of the functional block diagram shown in FIG. 2. A processor PZ determines a target charge pressure plds from the engine speed nmot, the throttle valve position dk, which reflects the wish of the driver, and possibly from additional operating variables not mentioned here. The derivation of the target charge pressure plds is not described in more detail. At a first connecting point V1, the deviation $\Delta$pld between the target charge pressure plds and an actual charge pressure pld is determined. The deviation value $\Delta$pld for the charge pressure is supplied to a first regulator R1 (e.g., a PI or PID regulator). The output quantity of first regulator R1 corresponds to a target value pags of the exhaust gas back pressure in exhaust gas channel 3. At a second connecting point V2, the deviation $\Delta$pag between target exhaust gas back pressure pags and actual exhaust gas back pressure pag is determined. The deviation value $\Delta$pag for the exhaust gas back pressure is supplied to a second regulator R2, which finally forms controlled variable vtg for the changeable turbine geometry.

Actual charge pressure pld can either be measured by pressure sensor 8 in induction pipe 2, or an estimated value for the actual charge pressure can be derived by processor PZ from various operating quantities of the internal combustion engine. The broken line in FIG. 2 indicates that the actual charge pressure pld is an estimated value determined by processor PZ. The actual exhaust gas back pressure pag can be a measurement value of pressure sensor 12 in exhaust gas channel 3. However, an estimated value derived by processor PZ from operating quantities of the internal combustion engine can also be used for actual exhaust gas back pressure pag. The broken line extending from processor PZ to second branching point V2 indicates that the actual exhaust gas back pressure pag is an estimated value calculated by processor PZ. The calculation of the estimated values for the actual charge pressure pld and the actual exhaust gas back pressure pag is not explained in more detail.

Closing the turbine geometry results in an increase in the exhaust gas back pressure pag in exhaust gas channel 3 before turbine 4, and thus also an increase of the energy coupled into turbine 4. This increases the charger rotational speed, and simultaneously also increases charge pressure pld in induction pipe 2. If an exhaust gas recirculation, as shown in FIG. 1, is present, exhaust gas can move into the induction pipe via exhaust gas recirculation channel 6 by opening valve 7, if exhaust gas back pressure pag is greater than charge pressure pld. If exhaust gas recirculation valve 7 is opened, exhaust gas back pressure pag decreases, resulting in a decrease in charge pressure pld in induction pipe 2.

The present invention utilizes the fact that exhaust gas back pressure pag reacts significantly faster to an adjustment in the turbine geometry than does charge pressure pld. The reaction of charge pressure pld is delayed by the time constant of the exhaust gas turbocharger. Therefore, the dynamic behavior of a regulator for the charge pressure is essentially limited by the moment of inertia of the turbocharger. The time constant that occurs here is however significantly greater than the time constant of some disturbances that act on the system due to the time-variant behavior of the control path, the opening and closing of exhaust gas recirculation valve 7, or errors in the conducting apparatus of turbine 4. Disturbances in the conducting apparatus of the turbine, changes in the valve stroke, changes of exhaust gas recirculation valve 7, or changes of the operating point of the internal combustion engine have a very direct influence on exhaust gas back pressure pag, and can therefore be compensated very quickly in the underlying control circuit with regulator R2. The higher-level control circuit with regulator R1 must be designed to be slower than the lower-level control circuit having regulator R2. However, since charge pressure pld is more sluggish than exhaust gas back pressure pag, this condition is automatically met.

Given a low mass throughput through internal combustion engine 1, the maximum achievable torque, or the maximum achievable power, of internal combustion engine 1 is limited by the maximum achievable charge pressure, even in stationary operation of internal combustion engine 1.

In order to improve the dynamics and the response characteristic of the internal combustion engine, and to increase the maximum achievable charge pressure, for multiple-stage supercharging, a plurality of exhaust gas turbochargers can be connected one after the other. These can differ in the magnitude of the charge pressure they produce.

According to the present invention, in an internal combustion engine having multiple-stage supercharging, in particular having at least two exhaust gas turbochargers, it is provided to determine a first controlled variable for a first actuating element, a second controlled variable for a second actuating element, and if necessary at least one additional controlled variable for at least one additional actuating element, dependent on the exhaust gas back pressure pag prevailing in exhaust gas channel 3 at the output of internal combustion engine 1. In the case in which the internal combustion engine is supercharged by, for example, two exhaust gas turbochargers, the charge pressure of a first turbocharger is set by the first actuating element and the charge pressure of a second turbocharger is set by the second actuating element.

Figure 3:
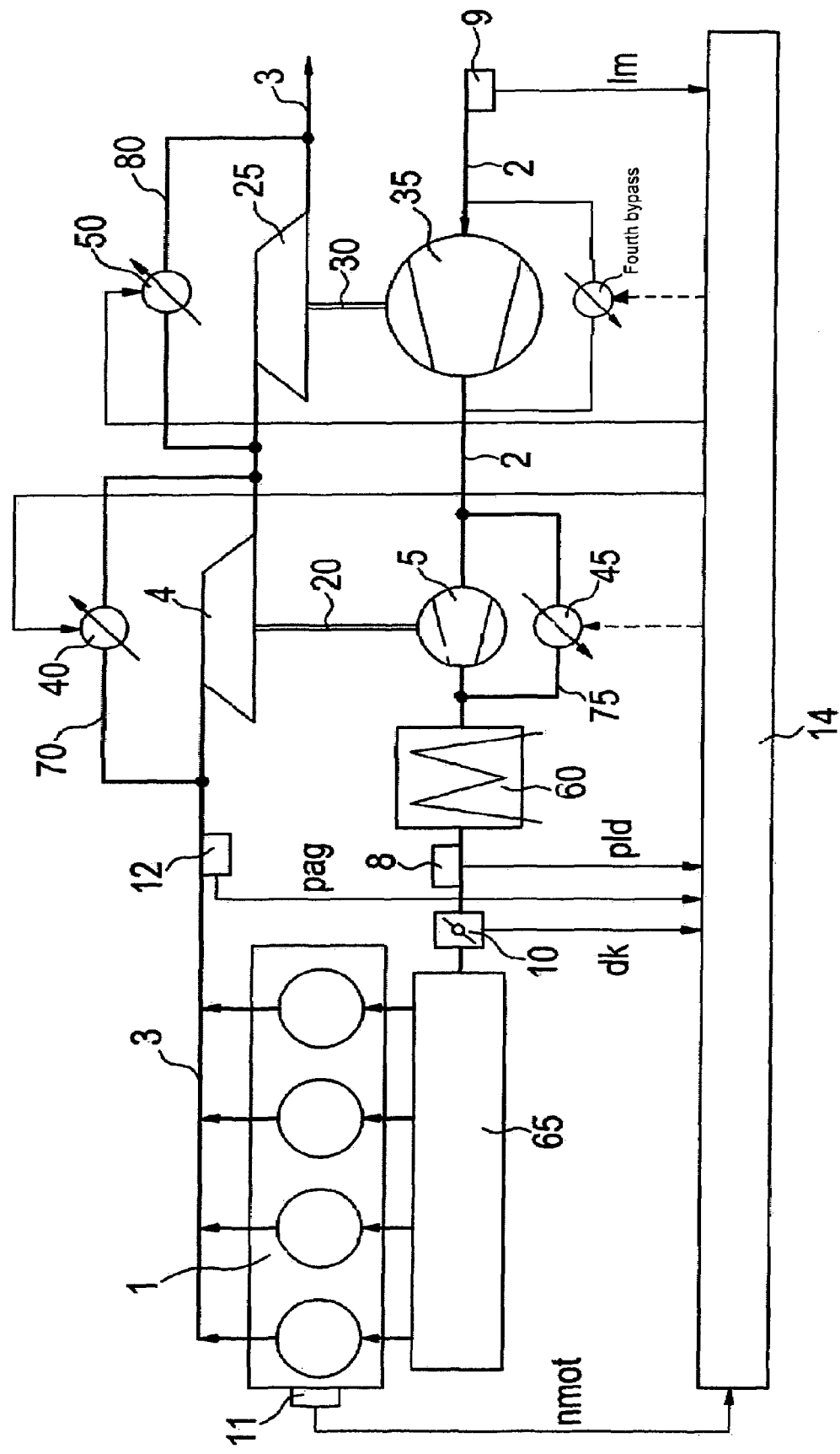
FIG. 3 shows a schematic representation of an internal combustion engine having two exhaust gas turbochargers.

FIG. 3 shows a schematic view of internal combustion engine 1 having two exhaust gas turbochargers. The schematic view shown in FIG. 3 represents an expansion of the system shown in FIG. 1 by incorporating an additional exhaust gas turbocharger. In FIG. 3, elements identical to those in the previous Figures are designated by the same reference characters. In contrast to FIG. 1, in the schematic view according to FIG. 3 exhaust gas recirculation channel 6 with controllable valve 7 is no longer shown, because it is not important for the functioning of the present invention. In the system according to FIG. 3, an additional exhaust gas turbocharger is provided, i.e., a second turbine 25, downstream from first turbine 4 in exhaust gas channel 3, drives via a second shaft 30 a second compressor 35 that is situated upstream from first compressor 5 in intake port 2. Second turbine 25, second shaft 30, and second compressor 35 represent a second exhaust gas turbocharger, while first turbine 4, first compressor 5 and a first shaft 20 via which first turbine 4 drives first compressor 5 represent a first exhaust gas turbocharger. Air mass sensor 9 is situated upstream from second compressor 35 in intake port 2. The situation of the remaining sensors in the system according to FIG. 3 corresponds to that in FIG. 1.

In FIG. 3, in contrast to FIG. 1, an additional charge air cooler 60, which cools the compressed air, is shown between first compressor 5 and pressure sensor 8 in intake port 2. This is advantageous in particular in multiple-stage supercharging, in which, in comparison to single-stage supercharging, a higher charge pressure and thus also a higher intake air temperature can be produced. However, charge air cooler 60 does not play a role in the functioning of the present invention. In addition, FIG. 3 shows, in contrast to FIG. 1, a distributor 65 via which the fresh air supplied via intake port 2 is distributed to the individual cylinders of internal combustion engine 1. Each of the two exhaust gas turbochargers supplies a contribution to charge pressure pld that is measured by pressure sensor 8 downstream from charge air cooler 60 and from first compressor 5 in intake port 2. Here, the contribution of the first turbocharger to charge pressure pld is called the charge pressure of the first turbocharger, and the contribution of the second turbocharger to the charge pressure pld is called the charge pressure of the second turbocharger. According to the exemplary embodiment shown in FIG. 3, the first turbocharger is a high-pressure turbocharger, and the second turbocharger is a low-pressure turbocharger. This means that the first turbocharger operates at a higher pressure level than does the second turbocharger.

A further difference between the system according to FIG. 3 and the system according to FIG. 1 is that the charge pressure of the first turbocharger in FIG. 3 is not set by influencing the geometry of first turbine 4, but rather by controlling a first bypass valve 40 in a first bypass channel 70 around first turbine 4 in exhaust gas channel 3. This controlling is likewise carried out by control device 14. In addition, or alternatively, as shown in FIG. 3 by a dotted line, the charge pressure of the first turbocharger can also be set by controlling a second bypass valve 45 in a second bypass channel 75 around first compressor 5 in intake port 2. For the second turbocharger shown in FIG. 3, a setting of the allocated charge pressure is provided by controlling a third bypass valve 50 in a third bypass channel 80 around second turbine 25 in exhaust gas channel 3. The controlling of bypass valves 40, 45, 50 is carried out in each case by control device 14. In other respects, the system in FIG. 3 corresponds to the system in FIG. 1.

Figure 4:
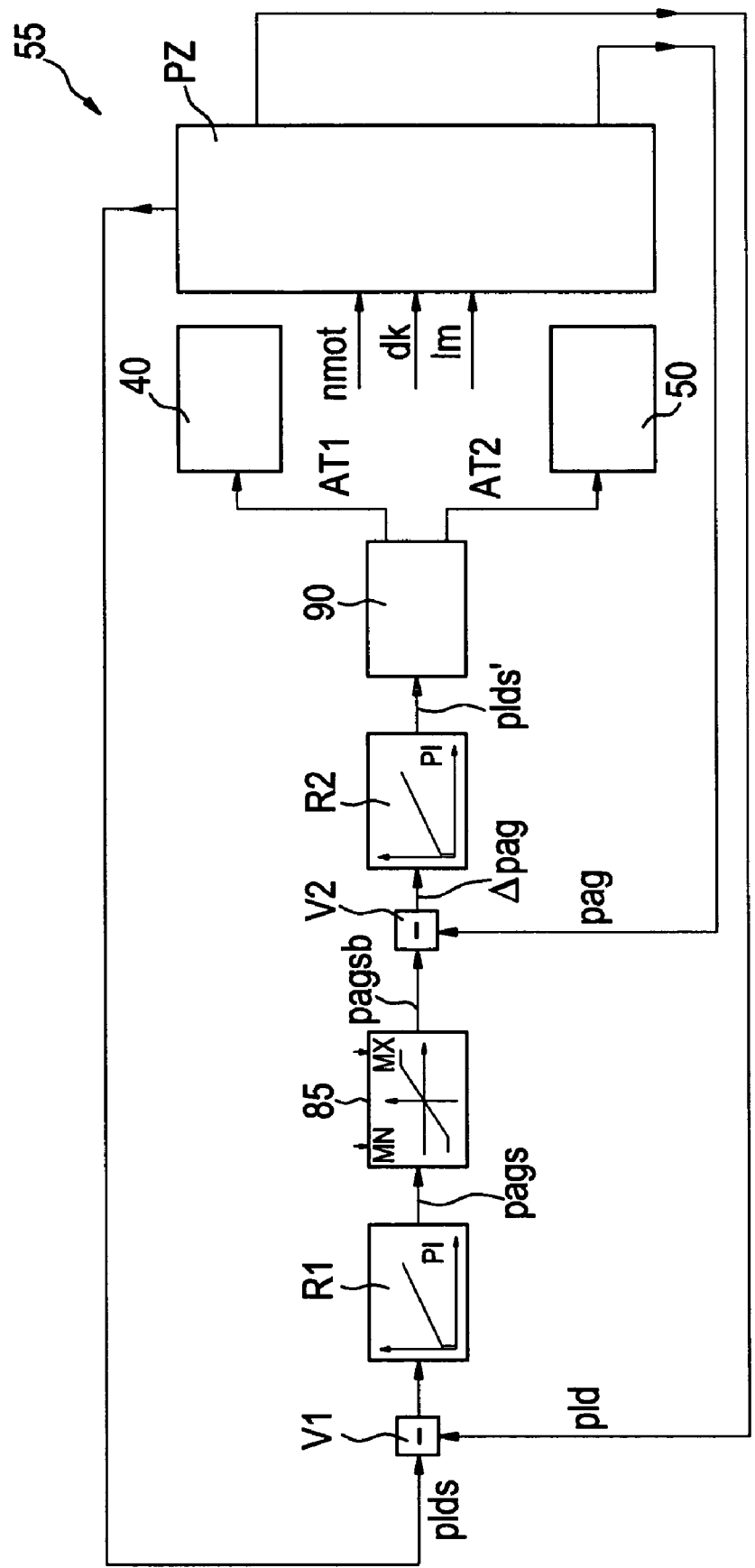
FIG. 4 shows a schematic block diagram illustrating the regulation of the charge pressure in multiple-stage supercharging.

The method of operation of the present invention is now explained in more detail on the basis of the schematic functional block diagram shown in FIG. 4. This schematic functional block diagram is equivalent to operational implementation of a device 55 according to the present invention with which the method according to the present invention is carried out. The schematic functional block diagram shown in FIG. 4 may be implemented in control device 14 in terms of software and/or in terms of hardware. The schematic functional block diagram according to FIG. 4 corresponds substantially to the functional diagram according to FIG. 2, and represents a charge pressure regulator having a lower-level regulation of exhaust gas back pressure pag. In FIG. 4, elements identical to those in the preceding Figures are designated by identical reference characters (e.g., reference characters in FIG. 2).

According to the present invention, as shown in the schematic functional block diagram according to FIG. 4, it is provided that the regulator output is divided among a plurality of actuators. In the following, the differences between the functional diagram according to FIG. 4 and the functional diagram according to FIG. 2 are described. Target value pags of the exhaust gas back pressure in exhaust gas channel 3, as the output quantity of first regulator R1, is supplied, optionally and as shown in FIG. 4, to a limiting element 85, where it is limited to a predetermined minimum value MN and/or to a predetermined maximum value MX. The predetermined minimum value MN and the predetermined maximum value MX are fixedly predefined in control device 14, and can be, for example, applied on a testing bench in such a way that, in the range formed by predetermined minimum value MN and predetermined maximum value MX for the target value of the exhaust gas back pressure pags, the components of internal combustion engine 1 are sufficiently protected against wear or even destruction. This is particularly advantageous for the multiple-stage supercharging of internal combustion engine 1, because higher exhaust gas back pressures can naturally occur in multiple-stage supercharging than in the case of a single-stage supercharging. For this reason, in multiple-stage supercharging, the limiting of the exhaust gas back pressure is of greater importance for the purpose of protecting the engine. Thus, a limited target value of exhaust gas back pressure pagsb is present at the output of limiting element 85 and is supplied to second connecting point V2. At second connecting point V2, actual exhaust gas back pressure pag is subtracted from the limited target value of exhaust gas back pressure pagsb, so that at the output of second connecting point V2 deviation value Δpag for the exhaust gas back pressure is formed in the manner described in relation to FIG. 2, and is then supplied to second regulator R2.

Another difference between the functional diagram according to FIG. 4 and the functional diagram according to FIG. 2 is that in the functional diagram according to FIG. 4 the output of second regulator R2 is supplied to a dividing element 90 that divides the output of second regulator R2 among a plurality of actuators. In the present example, dividing element 90 divides the output of second regulator R2 to a first actuator in the form of first bypass valve 40 and to a second actuator in the form of third bypass valve 50. Dividing element 90 can for example be realized as follows. Dividing element 90 can for example include a first characteristic for first bypass valve 40 and a second characteristic for third bypass valve 50. The input quantity for the two characteristics is in each case the output signal of second regulator R2. The output signal of the first characteristic is a control signal for first bypass valve 40, for example in the form of a first control mark-space ratio (or pulse-duty factor). The output signal of the second characteristic is then a control signal for third bypass valve 50, for example in the form of a second mark-space ratio.

In the simplest case, the two characteristics can be implemented as follows. If second regulator R2 requires a target charge pressure plds in the range from 50% to 100% of a maximum possible charge pressure that can be set, then the second characteristic outputs an actuating signal within this range to third bypass valve 50, according to which third bypass valve 50 is completely closed; in this case the second mark-space ratio is equal to zero. In contrast, with first mark-space ratio first bypass valve 40 is controlled in such a way that the desired target charge pressure plds can be implemented in the described range only by varying the degree of opening of first bypass valve 40. Here, it can be provided that for a required target charge pressure plds that corresponds to the maximum possible charge pressure that can be set, the first characteristic outputs a control signal to first bypass valve 40 with which first bypass valve 40 is completely closed, i.e., the first mark-space ratio is in this case equal to zero.

Up to the value of 50% of the maximum possible settable charge pressure for the target charge pressure plds that is to be set, the first characteristic then continuously increases the first mark-space ratio until first bypass valve 40 is completely open. This means that for a predetermined target charge pressure plds that corresponds to 50% of the maximum settable charge pressure, first bypass valve 40 is completely open, whereas third bypass valve 50 is still completely closed. For predetermined target charge pressures plds that are less than 50% of the maximum possible settable charge pressure, the first characteristic then always gives the value zero as the value for the first mark-space ratio, so that in this range first bypass valve 40 is completely open. In contrast, for a target charge pressure plds that is to be set that is in the range from zero to 50% of the maximum possible settable charge pressure, the second characteristic will emit a control mark-space ratio that, starting from the complete closing of third bypass valve 50 at 50% of the maximum settable charge pressure for target charge pressure plds, is increased continuously from zero up to a maximum value at which third bypass valve 50 is completely open, so that the target charge pressure plds to be set goes to zero.

Figure 5:
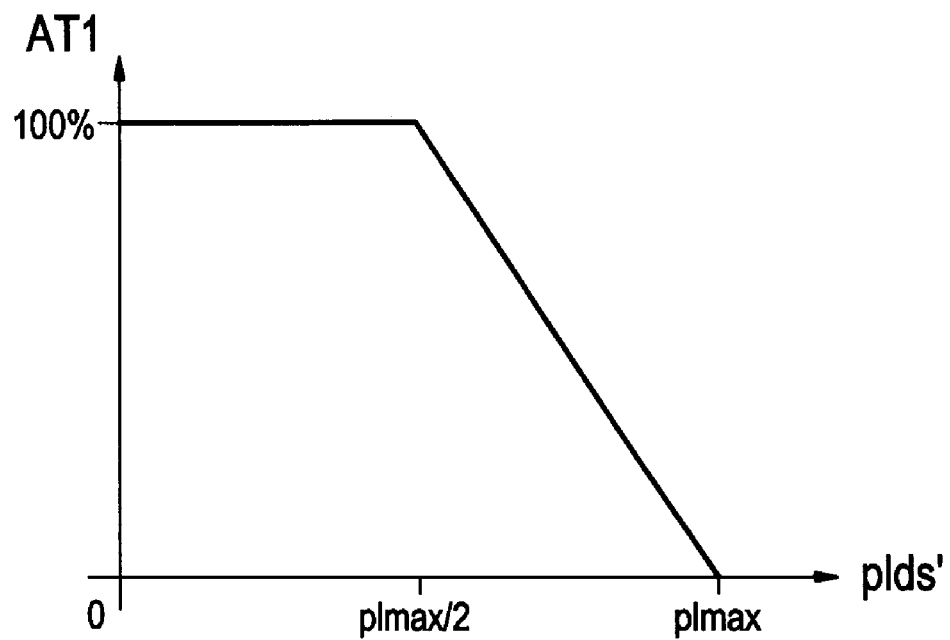
FIG. 5 shows a first characteristic curve of a dividing element.

In FIG. 5, the first characteristic is shown for this case. Here, the first control mark-space ratio is plotted on the ordinate, and the target charge pressure plds required by second regulator R2 is plotted on the abscissa. The maximum possible settable charge pressure is designated plmax. If the predetermined target charge pressure plds is between zero and plmax/2, the first control mark-space ratio is at 100%, i.e., is at its maximum, so that first bypass valve 40 is completely open. For predetermined target charge pressures plds between plmax/2 and plmax, the first control mark-space ratio then falls linearly from the value 100% at plmax/2 to the value zero at plmax. Thus, first bypass valve 40 is completely closed for plds=plmax.

Figure 6:
FIG. 6 shows a second characteristic curve of a dividing element.

In FIG. 6, the second characteristic is shown. Here, the second control mark-space ratio is plotted on the ordinate, and the target charge pressure plds is plotted on the abscissa. For the predetermined target charge pressure plds=0, the second control mark-space ratio corresponds to 100%, i.e., is at its maximum, so that third bypass valve 50 there is completely open. From plds=0 to plds=plmax/2, the second control mark-space ratio then falls linearly from 100% to zero. Here, the value zero for the second control mark-space ratio is achieved for plds=plmax/2. For predetermined target charge pressures plds between plmax/2 and plmax, the second control mark-space ratio is then equal to zero, and third bypass valve 50 is completely closed. The second control mark-space ratio is designated AT2 in FIG. 6, and the first control mark-space ratio is designated AT1 in FIG. 5.

The maximum settable charge pressure plmax can for example be determined on a test bench, and can be stored in control device 14 as a fixedly predetermined value.

In other respects, the functional diagram according to FIG. 4 corresponds to the functional diagram according to FIG. 2, in particular with respect to the function of processor PZ. Here, in the functional diagram according to FIG. 4, the controlled variables for first bypass valve 40 and third bypass valve 50 need not necessarily be supplied to processor PZ, because these variables are not required for the determination of target charge pressure plds, actual charge pressure pld, and actual exhaust gas back pressure pag.

Alternatively, the two characteristics in dividing element 90 can also be adapted differently, e.g., a range can also be provided for predetermined target charge pressure plds in which both characteristics supply control mark-space ratios AT1, AT2 that differ by zero and by 100%. In addition, it is also possible for more than two actuating elements to be controlled by dividing element 90, a corresponding characteristic being stored in dividing element 90 for each actuating element used, for the formation of the corresponding control signal dependent on the target charge pressure plds that is to be set. Thus, as described in FIG. 3, second bypass valve 45 could also be used as an actuating element. Furthermore, in addition or alternatively to the described actuating elements, actuating element 13 according to FIG. 1 could also be used to influence the geometry of first turbine 4, and/or an actuating element could be used to influence the geometry of second turbine 25. Furthermore, in addition or alternatively, a bypass valve in a bypass channel that surrounds second compressor 35 in intake port 2 could also be used as an actuating element. Here, for the present invention, it is essential that at least two exhaust gas turbochargers be formed, at least one actuating element of each exhaust gas turbocharger being controlled using a corresponding controlled variable, dependent on the exhaust gas back pressure pag prevailing in exhaust gas channel 3 at the output of internal combustion engine 1.

In the present example, it has been assumed that second regulator R2 according to the functional diagram in FIG. 4 also outputs a value for target charge pressure plds to dividing element 90, which forms therefrom, according to the two characteristics according to FIGS. 5 and 6, i.e., first control mark-space ratio AT1 and second control mark-space ratio AT2, respectively. Instead of a value for target charge pressure plds determined dependent on the deviation value Δpag for the exhaust gas back pressure, it can also be provided that second regulator R2 outputs to dividing element 90 an output quantity that correlates with target charge pressure plds, for which a maximum value is correspondingly predetermined and that is converted in a corresponding manner into a first mark-space ratio AT1 and a second mark-space ratio AT2 with the aid of two characteristics, as described. In order to distinguish the target charge pressure supplied by second regulator R2 from the target charge pressure plds supplied by processor PZ, in FIGS. 4, 5, and 6 the target charge pressure supplied by second regulator R2 is designated plds'. Furthermore, dividing element 90 can also be regarded as belonging to second regulator R2.

Target charge pressure plds predetermined by processor PZ can be entirely different from target charge pressure plds' predetermined by second regulator R2.

In the above-described structures of the charge pressure regulation according to FIG. 2 or FIG. 4, both pneumatic actuators and also electrical actuators with position controlling can be used for the actuating elements for setting the charge pressure of the first exhaust gas turbocharger or for setting the charge pressure of the second exhaust gas turbocharger.

What is claimed is:

1. A method for regulating a charge pressure of an internal combustion engine having at least two exhaust-gas turbochargers, comprising:
   providing a first actuating element for setting a charge pressure of a first exhaust-gas turbocharger;
   providing a second actuating element for setting a charge pressure of a second exhaust gas turbocharger; and
   determining, dependent on an exhaust-gas back pressure prevailing in an exhaust-gas channel at an output of the internal combustion engine, a first controlled variable for the first actuating element and a second controlled variable for the second actuating element, wherein the first controlled variable and the second controlled variable are determined as a function of one and the same exhaust-gas back pressure prevailing in the exhaust-gas channel at the output of the internal combustion engine.

2. The method as recited in claim 1, further comprising:
determining by a first regulator a target exhaust-gas back pressure from a deviation between a target charge pressure and an actual charge pressure; and
deriving by a second regulator the first and second controlled variables for the first and second actuating elements, based on a deviation between the target exhaust-gas back pressure and one of a measured and estimated actual exhaust-gas back pressure.

3. The method as recited in claim 2, wherein the target exhaust-gas back pressure is limited to a predetermined range.

4. The method as recited in claim 2, wherein the first controlled variable influences one of: a) a variable geometry of a turbine of the first exhaust-gas turbocharger; b) an opening cross-section of a first bypass around the turbine of the first exhaust-gas turbocharger; and c) an opening cross-section of a second bypass around a compressor of the first exhaust-gas turbocharger.

5. The method as recited in claim 4, wherein the second controlled variable influences one of: a) a variable geometry of a turbine of the second exhaust-gas turbocharger; b) an opening cross-section of a third bypass around the turbine of the second exhaust-gas turbocharger; and c) an opening cross-section of a fourth bypass around a compressor of the second exhaust-gas turbocharger.

6. The method as recited in claim 2, wherein the second controlled variable influences one of: a) a variable geometry of a turbine of the second exhaust-gas turbocharger; b) an opening cross-section of a third bypass around the turbine of the second exhaust-gas turbocharger; and c) an opening cross-section of a fourth bypass around a compressor of the second exhaust-gas turbocharger.

7. The method as recited in claim 1, wherein the target exhaust-gas back pressure is limited to a predetermined range.

8. The method as recited in claim 7, wherein the first controlled variable influences one of: a) a variable geometry of a turbine of the first exhaust-gas turbocharger; b) an opening cross-section of a first bypass around the turbine of the first exhaust-gas turbocharger; and c) an opening cross-section of a second bypass around a compressor of the first exhaust-gas turbocharger.

9. The method as recited in claim 8, wherein the second controlled variable influences one of: a) a variable geometry of a turbine of the second exhaust-gas turbocharger; b) an opening cross-section of a third bypass around the turbine of the second exhaust-gas turbocharger; and c) an opening cross-section of a fourth bypass around a compressor of the second exhaust-gas turbocharger.

10. The method as recited in claim 7, wherein the second controlled variable influences one of: a) a variable geometry of a turbine of the second exhaust-gas turbocharger; b) an opening cross-section of a third bypass around the turbine of the second exhaust-gas turbocharger; and c) an opening cross-section of a fourth bypass around a compressor of the second exhaust-gas turbocharger.

11. The method as recited in claim 1, wherein the first controlled variable influences one of: a) a variable geometry of a turbine of the first exhaust-gas turbocharger; b) an opening cross-section of a first bypass around the turbine of the first exhaust-gas turbocharger; and c) an opening cross-section of a second bypass around a compressor of the first exhaust-gas turbocharger.

12. The method as recited in claim 11, wherein the second controlled variable influences one of: a) a variable geometry of a turbine of the second exhaust-gas turbocharger; b) an opening cross-section of a third bypass around the turbine of the second exhaust-gas turbocharger; and c) an opening cross-section of a fourth bypass around a compressor of the second exhaust-gas turbocharger.

13. The method as recited in claim 1, wherein the second controlled variable influences one of: a) a variable geometry of a turbine of the second exhaust-gas turbocharger; b) an opening cross-section of a third bypass around the turbine of the second exhaust-gas turbocharger; and c) an opening cross-section of a fourth bypass around a compressor of the second exhaust-gas turbocharger.

14. A device for regulating a charge pressure of an internal combustion engine having at least two exhaust-gas turbochargers, comprising:
a first actuating element for setting a charge pressure of a first exhaust-gas turbocharger;
a second actuating element for setting a charge pressure of a second exhaust gas turbocharger; and
a control arrangement for determining, dependent on an exhaust-gas back pressure prevailing in an exhaust-gas channel at an output of the internal combustion engine, a first controlled variable for the first actuating element and a second controlled variable for the second actuating element, wherein the first controlled variable and the second controlled variable are determined as a function of one and the same exhaust-gas back pressure prevailing in the exhaust-gas channel at the output of the internal combustion engine.

15. The device as recited in claim 14, wherein the control arrangement includes:
a first regulator for determining a target exhaust-gas back pressure from a deviation between a target charge pressure and an actual charge pressure; and
a second regulator for deriving the first and second controlled variables for the first and second actuating elements, based on a deviation between the target exhaust-gas back pressure and one of a measured and estimated actual exhaust-gas back pressure.

* * * * *